US 8,532,288 B2

(12) United States Patent
Fayad et al.

(10) Patent No.: US 8,532,288 B2
(45) Date of Patent: Sep. 10, 2013

(54) SELECTIVELY ISOLATING PROCESSOR ELEMENTS INTO SUBSETS OF PROCESSOR ELEMENTS

(75) Inventors: Camil Fayad, Poughkeepsie, NY (US); John K. Li, Woodstock, NY (US); Siegfried K. H. Sutter, Elsendorf (DE); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 11/565,918

(22) Filed: Dec. 1, 2006

(65) Prior Publication Data

US 2008/0130874 A1 Jun. 5, 2008

(51) Int. Cl.
*G06F 21/00* (2006.01)

(52) U.S. Cl.
USPC ............ 380/44; 380/45; 380/46; 380/47; 380/28; 380/29; 380/30; 712/1; 712/7; 712/9; 712/10; 712/11; 712/12; 712/13; 712/14; 712/15; 712/16; 712/17; 712/20; 712/21; 712/22

(58) Field of Classification Search
USPC ............ 712/1–22; 380/28–30, 44–30
See application file for complete search history.

(56) References Cited

U.S. PATENT DOCUMENTS

| | | | |
|---|---|---|---|
| 4,939,642 A * | 7/1990 | Blank | 712/22 |
| 5,321,752 A | 6/1994 | Iwamura et al. | |
| 5,448,639 A | 9/1995 | Arazi | |
| 5,513,133 A | 4/1996 | Cressel et al. | |
| 5,666,169 A * | 9/1997 | Ohki et al. | 348/721 |
| 5,764,554 A | 6/1998 | Monier | |
| 5,878,241 A | 3/1999 | Wilkinson et al. | 395/379 |
| 5,974,523 A * | 10/1999 | Glew et al. | 712/23 |
| 6,226,734 B1 | 5/2001 | Kleinsorge et al. | 712/13 |
| 6,247,109 B1 | 6/2001 | Kleinsorge et al. | 712/13 |
| 6,321,373 B1 | 11/2001 | Ekanadham et al. | 717/1 |
| 6,334,177 B1 | 12/2001 | Baumgartner et al. | 712/13 |
| 6,345,287 B1 | 2/2002 | Fong et al. | 709/102 |
| 6,366,945 B1 | 4/2002 | Fong et al. | 709/104 |

(Continued)

FOREIGN PATENT DOCUMENTS

| | | |
|---|---|---|
| JP | 05068032 | 3/1993 |
| JP | 05324277 | 12/1993 |

(Continued)

OTHER PUBLICATIONS

Data Manipulating Functions in Parallel Processors and Their Implementations by Tse-Yun Feng; Publisher: IEEE; Year: 1973.*

(Continued)

*Primary Examiner* — Madhuri Herzog
(74) *Attorney, Agent, or Firm* — Steven Chiu, Esq.; Kevin P. Radigan, Esq.; Heslin Rothenberg Farley & Mesiti P.C.

(57) ABSTRACT

A cryptographic engine for modulo N multiplication, which is structured as a plurality of almost identical, serially connected Processing Elements, is controlled so as to accept input in blocks that are smaller than the maximum capability of the engine in terms of bits multiplied at one time. The serially connected hardware is thus partitioned on the fly to process a variety of cryptographic key sizes while still maintaining all of the hardware in an active processing state.

20 Claims, 6 Drawing Sheets

(56) References Cited

U.S. PATENT DOCUMENTS

| | | | |
|---|---|---|---|
| 6,381,682 B2 | 4/2002 | Noel et al. ................... 711/153 |
| 6,470,442 B1 | 10/2002 | Arimilli et al. ................ 712/32 |
| 6,546,104 B1 | 4/2003 | Shimbo et al. |
| 6,587,938 B1 | 7/2003 | Eilert et al. ................... 712/29 |
| 6,633,916 B2 | 10/2003 | Kauffman .................... 709/229 |
| 6,778,961 B2 * | 8/2004 | Walker et al. ................ 704/260 |
| 6,978,016 B2 | 12/2005 | Chen et al. |
| 7,080,110 B2 | 7/2006 | Chen et al. |
| 2002/0059353 A1 | 5/2002 | Koc et al. |
| 2004/0054706 A1 | 3/2004 | Kawamura |
| 2004/0133765 A1 * | 7/2004 | Tanaka et al. ................ 712/215 |
| 2004/0210614 A1 * | 10/2004 | Chen et al. ................... 708/492 |
| 2004/0254965 A1 * | 12/2004 | Giernalczyk et al. ......... 708/160 |

FOREIGN PATENT DOCUMENTS

| | | |
|---|---|---|
| JP | 09016379 | 1/1998 |
| JP | 09274560 | 10/1998 |
| JP | 11143668 | 5/1999 |
| JP | 11282351 | 10/1999 |
| JP | 2001051832 | 2/2001 |
| JP | 2002014939 A | 1/2004 |

OTHER PUBLICATIONS

Design of a Massively Parallel Processor by Kenneth Batcher; Publisher: IEEE; Year: 1980.*

"Dynamic Load Balancing," IBM Technical Disclosure Bulletin, P. Altevogt and A. Linkle, vol. 37, No. 10, Oct. 1994, pp. 659-661.

Kornerup, Peter; "A Systolic, Linear-Array Multiplier for a Class of Right-Shift Agorithms," IEEE Transactions on Computers, vol. 43, No. 8, Aug. 1994, pp. 892-898.

Montgomery, Peter L., "Modular Multiplication Without Trial Division," Mathematics of Computation, vol. 44, No. 170, Apr. 1985, pp. 519-521.

Office Action for U.S. Patent No. 6,978,016, dated Aug. 18, 2004.

Office Action for U.S. Patent No. 7,080,110, dated Jul. 21, 2005.

* cited by examiner

SELECTIVELY ISOLATING PROCESSOR ELEMENTS INTO SUBSETS OF PROCESSOR ELEMENTS

CROSS-REFERENCE TO RELATED APPLICATIONS

This application contains subject matter which is related to the subject matter of the following documents, each of which is assigned to the same assignee as this application. Each of the below listed documents is hereby incorporated herein by reference in its entirety:

U.S. Pat. No. 7,080,110 titled "Hardware Implementation for Modular Multiplication Using a Plurality of Almost Entirely Identical Processor Elements," issued Jul. 18, 2006.

U.S. Pat. No. 6,978,016 titled "Circuits for Calculating Modular Multiplicative Inverse," issued Dec. 20, 2005.

The above referenced issued patents are each members of a family of patent documents. The specifications of these documents are similar to the specifications of the other documents in the family.

TECHNICAL FIELD

The present invention is generally directed to encryption and decryption engines. In particular, it is directed to the use of a cryptographic engine which is constructed as a set of nearly identical processing elements which set is capable of being partitioned to operate in a variety of ways. This engine is described in detail in U.S. Pat. No. 7,080,110, which is referenced above. Even more particularly, the present invention is directed to systems and methods for carrying out multiplication modulo N, typically a large prime number.

BACKGROUND OF THE INVENTION

In the processing of cryptographic information, which includes both encryption and decryption, multiplication modulo a large prime number is a key step in the ultimately desired process of exponentiation modulo a large prime number. For purposes of this processing cryptographic keys are employed. The length of the key is the principal determiner of security. The longer the key (in bits), the greater is the security level. Because of the ever increasing capabilities of data processing hardware, the length of keys to meet desirable levels of security has steadily increased. The cryptography engine described in the referenced patent is capable of expansion to meet these needs. However, it is noted that in the field of cryptography, the keys that are employed are often of varying size. This is reflective of the fact that different users of cryptography will seek different levels of security. For example, one user might be satisfied with a key length of 1,024 bits while another might insist on using 4,096 bit keys. While a cryptographic engine that is capable of processing 4,096 bit keys could also process 1,024 bit keys, the processing power of the hardware that is applied to that problem is essentially wasted.

In U.S. Pat. No. 7,080,110 referenced above, there is disclosed a circuit for performing multiplication modulo N, where N is a large prime number. Such circuits are useful for carrying out exponentiation operations modulo N. As mentioned above, these mathematical operations lie at the heart of a significant number of methods for encrypting and decrypting data. The circuits disclosed therein provide a powerful and flexible method for constructing and using concatenated arrays of what are referred to as "processing elements." The similarity in structure of these processing elements is also seen to be of value in structuring a process in which operations are pipelined, thus increasing overall throughput. Accordingly, it is seen that the referenced issued patent provides a useful cryptographic engine which is used in the present invention. However, the present application describes a method of using the processing elements in a more flexible fashion to avoid the situation in which full hardware utilization fails to be achieved when there is a mix of cryptographic tasks presented to the engine.

SUMMARY OF THE INVENTION

The shortcomings of the prior art are overcome and additional advantages are provided through a method for controlling operations in a plurality of serially connected cryptographic processor elements. The method comprises the steps of supplying data to be processed in blocks to a plurality of subsets of the processor elements; and controlling the input and output from each one of the subsets of the processor elements so as to selectively isolate the processing elements into blocks matching the supplied blocks for processing the data independently.

In accordance with another embodiment of the present invention there is provided a method for operating a set of serially connected processing elements configured for carrying out multiplication modulo N. The method comprises supplying data to the circuit in blocks of varying size and controllably partitioning the processing elements into blocks matching the varying sizes of the blocks in the data.

In both of the methods set forth above it is desirable to prepackage blocks of data into groups most of which match in size the total number of the serially connected processing elements. For example, if the total size that the serially connected processing elements can handle 4,096 bits, then the data might be grouped in packages of 2048, 1024, 512 and 512 bits. It is desired that in each group the total number of bits being processed (2048+1024+512+512, in the above example) is equal to the capacity of the collection of serially connected processing elements. While it is recognized that this grouping is desirable, it is not essential. However, it is noted that the flexible partitioning of the serially connected processing elements provides a mechanism for reaching this objective.

Accordingly, it is seen that it is an object of the present invention to improve the operations of cryptographic devices for encoding, decoding, signature verification and authentication.

It is also an object of the present invention to exploit the block structure present in a cryptographic engine which is structured as a serially connected chain of nearly identical processing elements.

It is yet another object of the present invention to make better use over time of cryptographic engines which are structured as a serially connected chains of processing elements.

It is a further object of the present invention to make the fullest possible use of hardware present in the processing of a cryptographic instruction.

It is a still further object of the present invention to keep the processing elements as busy as possible.

Additional features and advantages are realized through the systems and methods of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
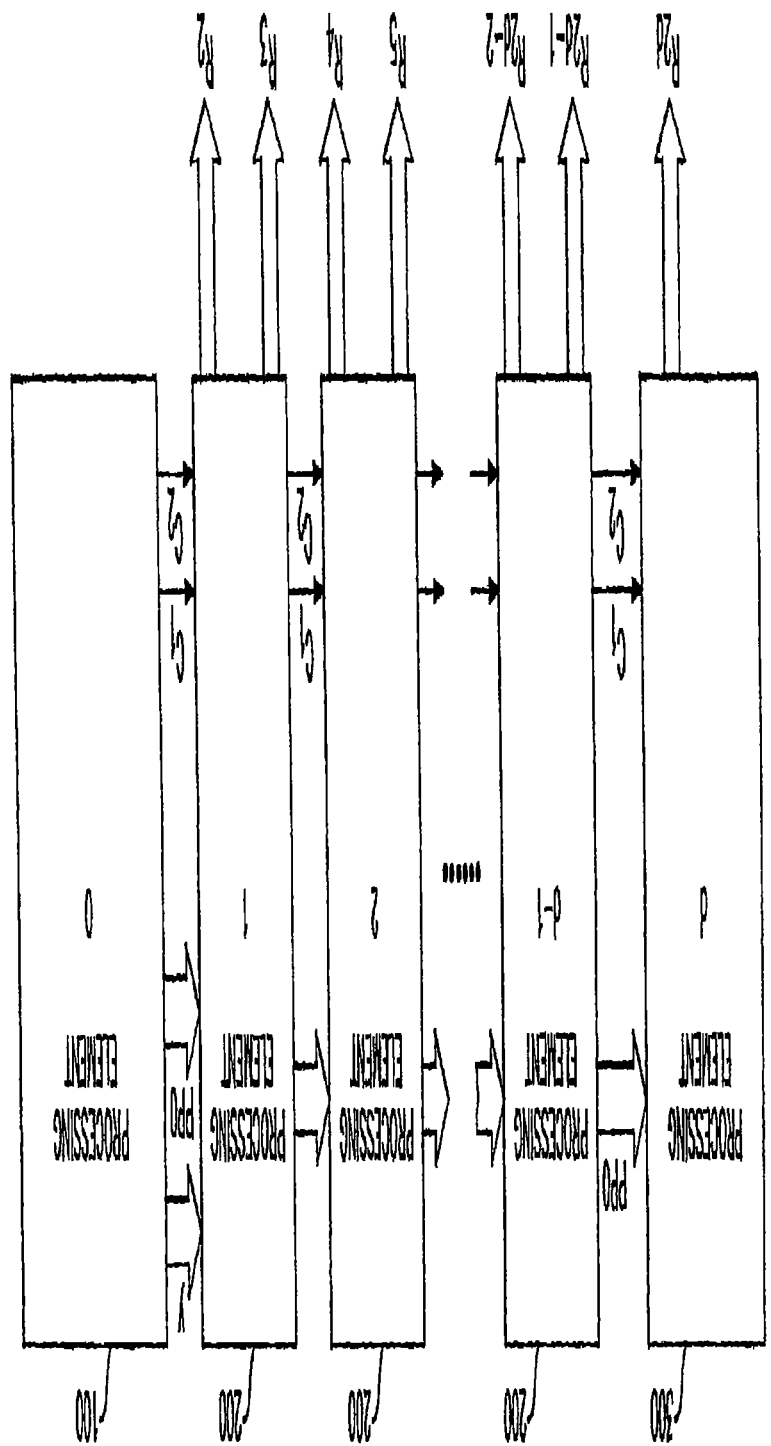
FIG. 1 is a block diagram illustrating how individual processor elements are connected to produce the same results as a circuit in which much larger adder and multiplier elements would need to be employed.
Figure 4:
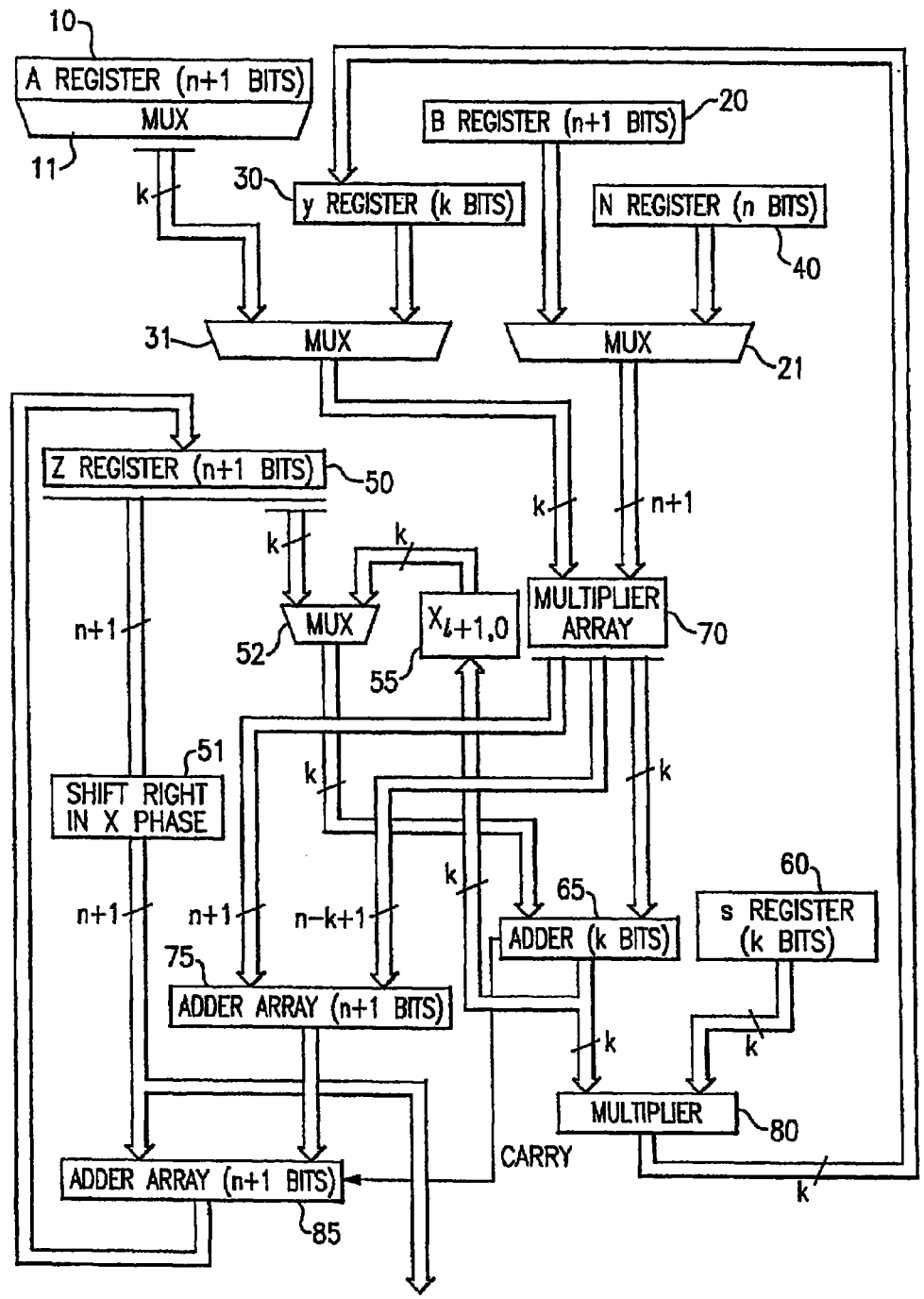
FIG. 4 block diagram illustrating the circuit that is partitioned into a sequence of processing elements for a method and system for multiplication modulo N.
Figure 5:
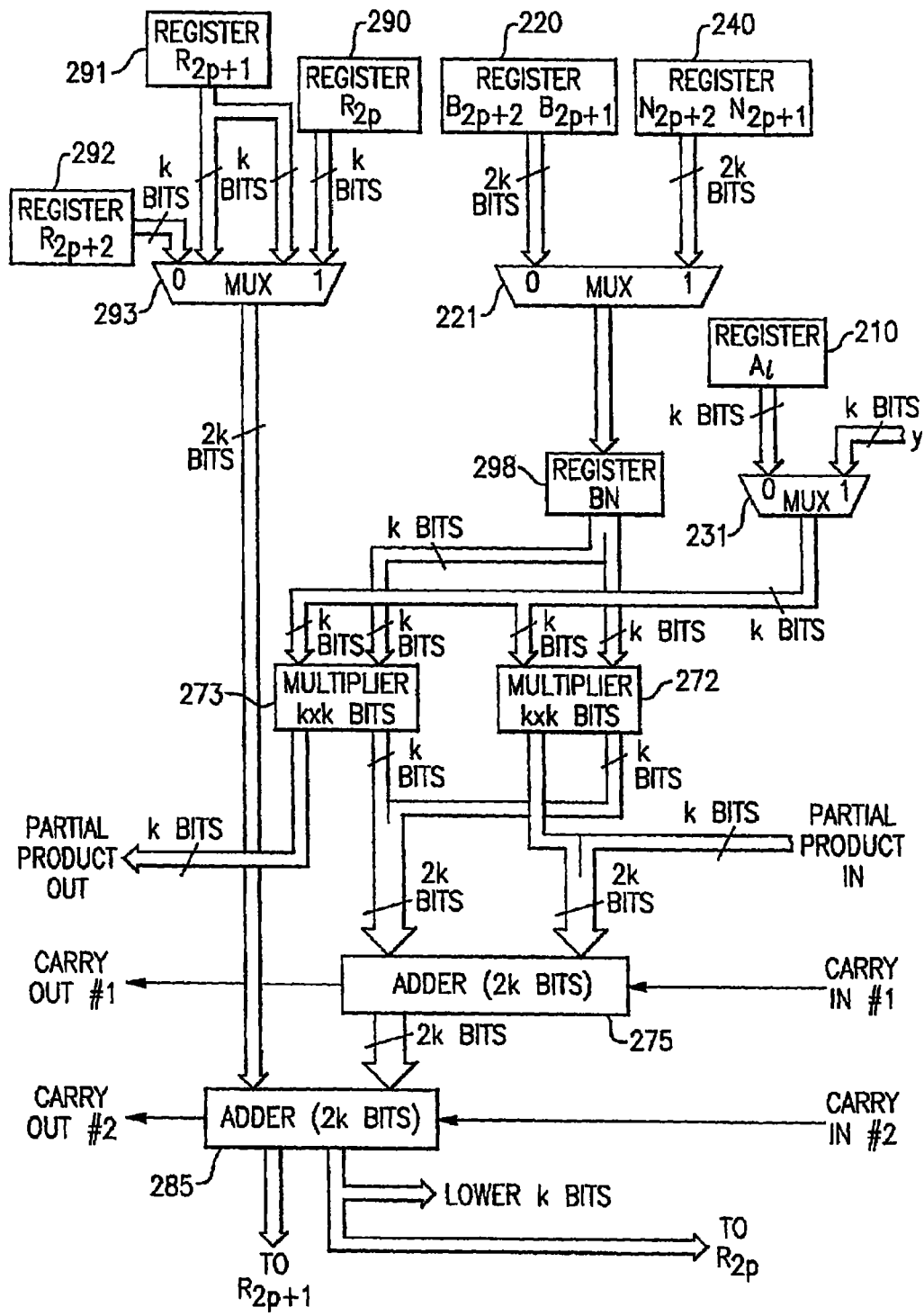
FIG. 5 is a block diagram providing a detailed view of the construction of one of the processing elements referred to in FIG. 1.

FIG. 1 illustrates the overall pattern of processing element connections employed for the purpose of carrying out multiplication modulo N. In particular FIG. 1 illustrates the connection pattern for the plurality of processing elements that are derived from the circuit structure shown in FIG. 4. FIG. 4 illustrates a modified Montgomery multiplication structure for multiplication modulo N from the point of view of carrying out the processing steps in two phases. The inventors in the cited patent realized that the "wide" processing elements in FIG. 4 can be broken up into a series of processing elements 200. These processing elements, as shown in detail in FIG. 5, are arranged serially as shown in FIG. 1 with the processing element on the right passing a Partial Product Output (PPO) and two carries, $C_1$ and $C_2$, to the processing element on its left. For both the zeroeth and the last processing elements (100 and 300, respectively) minor changes are made in the circuitry as shown in the cited patent.

Figure 2:
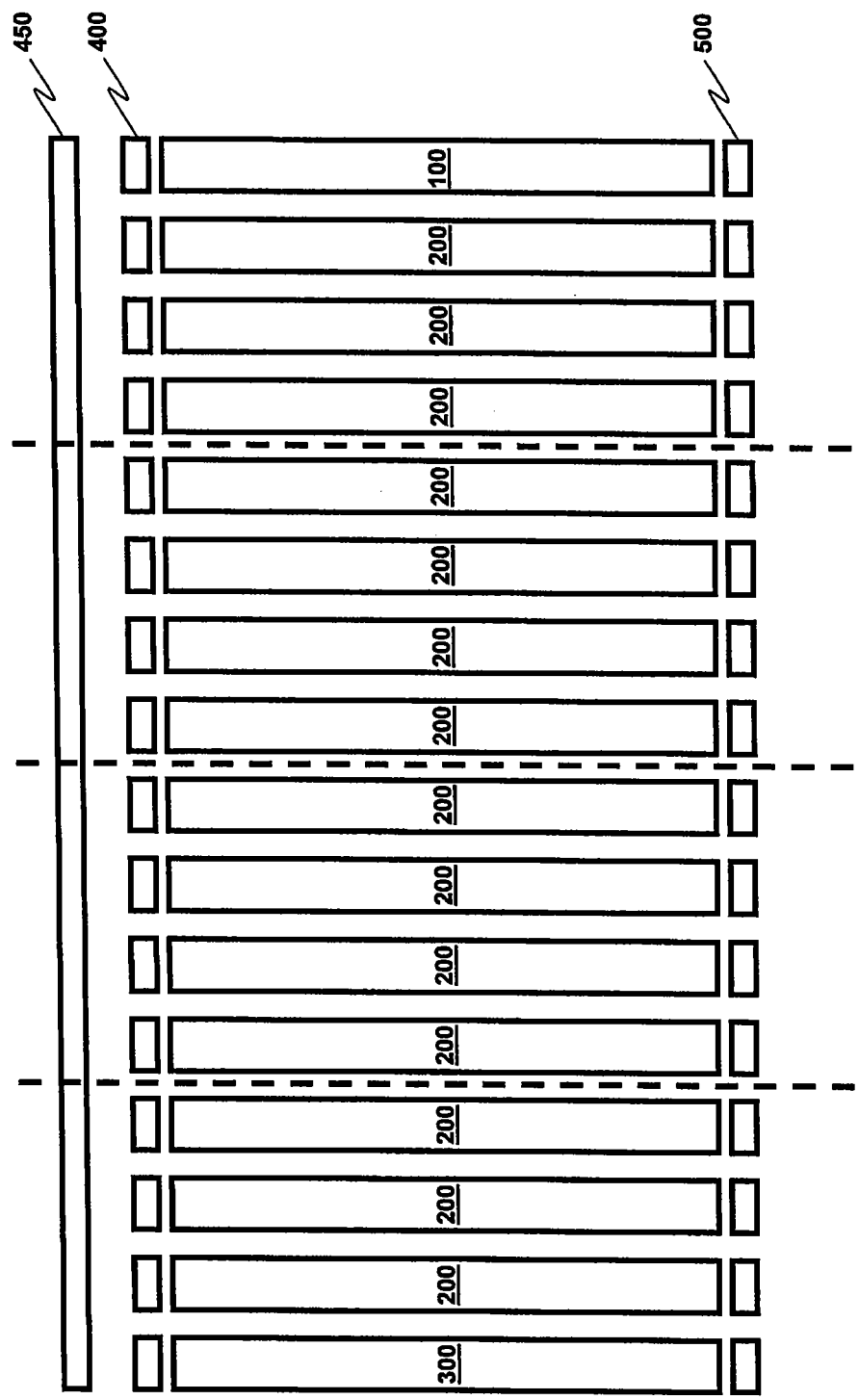
FIG. 2 is a block diagram more particularly illustrating how one might partition a group of processor elements to perform operations in parallel on smaller blocks of data.

The structure shown in FIG. 1 is shown in slightly more detail in FIG. 2. However, in FIG. 2 processing elements 100, 200 and 300 are shown in a configuration in which they are arranged in blocks. In operation, even those which take advantage of pipelining, the circuit of the cited patent, for which the present application is an improvement, works in a fashion in which downstream processing elements are not fully utilized all of the time. However, by providing input register bank 400, controlled by circuit 450, blocks of processing elements are operated independently on smaller chunks of data to produce independent output data in output register bank 500.

Figure 3:
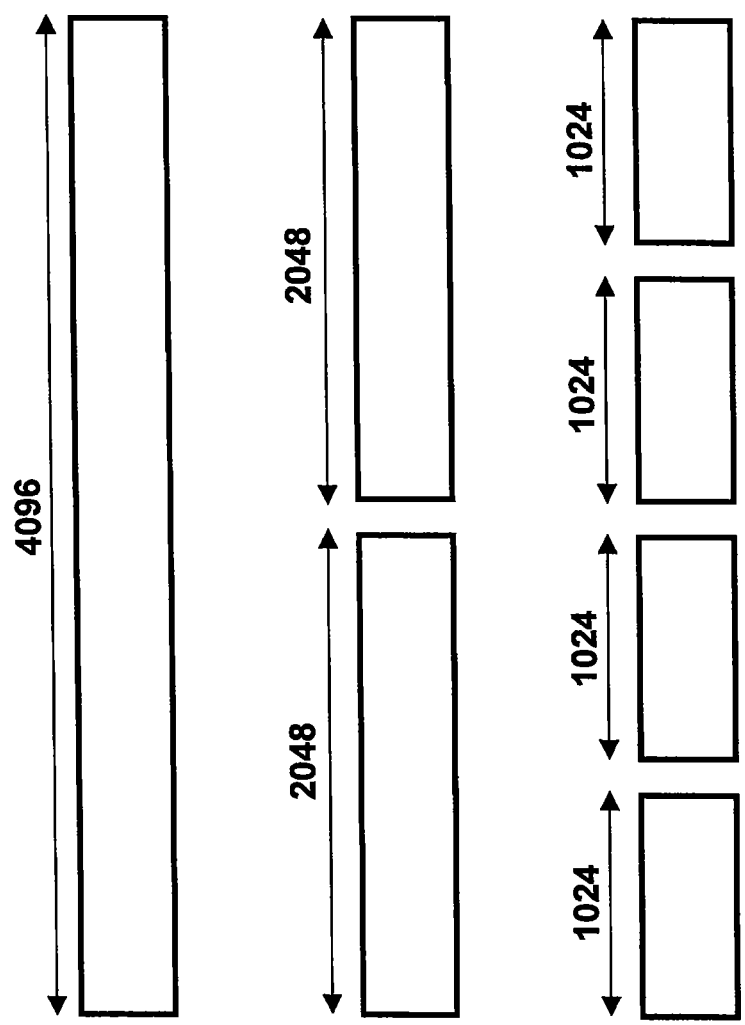
FIG. 3 is a block diagram illustrating three typical ways in which a set of processor elements are may be partitioned.

This is useful when the data is structured as shown in FIG. 3. For example, if there are 64 registers with 64 bits each, corresponding to Processing Elements $PE_0$ through $PE_{63}$, the system is capable of processing a single 4,096 bit multiplication. Eventually, in the course of processing this information, the Processing elements on the left will become actively engaged in this processing. Pipelining the data eventually keeps all of the Processing Elements in an active processing state. However, if the task switches to processing two multiplications, each with 2,048 bits, the originally contemplated operation of the cited circuits processes them in a serial fashion. However, by controlling the information loaded into input register bank 400, and isolating via control circuit 450 the Processing Elements into blocks as suggested in FIG. 2, it is possible to now simultaneously process two multiplications each having 2,048 bits, thus assuring that more of the Processing Elements are busier more of the time. Likewise, FIG. 3 further extends this concept to the situation in which four blocks of isolated Processing Elements are simultaneously processing the multiplication of 1,024 bit entries. Again, by providing the data in blocks and by isolating the Processing elements, it is possible to keep more of the hardware busier more of the time. As described above, the Processing Elements are also capable of processing a single 2,048 bit multiplier and two 1,024 bit multipliers. Other processing partitions are equally possible with a natural proclivity to employ blocks whose sizes are powers of two.

A hardware circuit for carrying out this process is illustrated in FIG. 4. In particular, the factor A of n+1 bits, which is a factor which is treated as being in partitioned form, is stored in A register (10). Multiplexor 11 supplies sequential blocks of k bits from register 10 to multiplexor 31, with k=32 bits for illustration. Multiplexors 31, 21, and 52 operate in conjunction with one another selecting one of two possible input values depending upon whether or not the circuit is operating in the X-phase or the Z-phase. Accordingly, during the first phase of its operation, multiplexor 11 provides the k bits in $A_0$. In the first phase of the second cycle, the next k bits $A_1$ in A are supplied via multiplexor 11. A sub-block of k bits from A is provided during the initial or X phase portion of each cycle. In the third cycle, multiplexor 11, therefore, provides the next k bits in A, namely, the bits denoted above and herein as $A_2$. Accordingly, multiplexor 11 is seen to operate selectively as a function of the cycle number (namely, cycles 0 through m−1).

During the X-phase of each cycle, the value $A_1$ is selected from the A Register (10) via multiplexor 11 and correspondingly multiplexor 21 selects the contents of the B Register (20). Thus, the numbers to be multiplied are stored in registers 10 and 20. It does not matter which number is stored in which register. It is also noted that, whether or not the circuit is operating in the initial X-phase or in the final Z-phase in each cycle, multiplexors 31 and 21 supply k bits and n+1 bits, respectively, to multiplier array 70 in each phase. It is thus seen that, during the X-phase, multiplexors 31 and 21 select contents from the B register and part of the A register. It is also noted that, in one exemplar situation, the value of n is around 512 or some other convenient power of 2 and the value of k is 32. Accordingly, it is seen that multiplier array 70 strikes a balance between 1 bit×n bit multiplication and full n bit×n bit multiplication. It is also noted that increases in the value of n are almost always, in practice, an increase by a factor of a power of two.

As with any binary multiplier with inputs that are n+1 bits wide and k bits wide respectively, multiplier array 70 produces an output which is n+1+k bits wide. The lower order k bits from multiplier array 70 are supplied to adder 65 which is designed to add two k bit addends at a time. In this regard, it is noted that adder 65 is present in the circuit for computing $y_1$. As such, and given that the value of $y_1$ is dependent upon the last k bits of the value $X_1$ which is a sum which has not yet been fully computed, it is necessary to perform this addition which is essentially the addition for the low order k bits of $X_1$. The first addend comes from the rightmost k bits in the Z register as selected by multiplexor 52. These bits are added to the k bits in the rightmost portion of the product $A_1B$. The output of adder 65 is $x_{1,0}$ which is the least significant k bits of $X_1=Z_1+A_1B$. This output is stored in register 55 and is also supplied to multiplier 80 which multiplies two k bit numbers together. This is not, however, a multiplication modulo N. The other factor supplied to multiplier 80 is the number s from the s register (60). Since this result is required modulo R, only the rightmost k bits from multiplier 80 are supplied back to the y register (30) in this X-phase. The value stored in this register is used during the calculation carried out in the Z-phase as discussed below.

The rest of the X-phase calculation is devoted to calculation of the high order n+1 bits of the sum $Z_1+A_1B$. Multiplier 70 is configured as a circuit for multiplying together the bits from the B Register (20) and a sequence of m blocks of k bits each from selected k bit blocks from the A register. Multiplication of two k bit numbers generally produces a number having 2k bits and, in particular, this is the situation with respect to applicants' multiplier 80. However, it is noted that the calculation of y, is computed modulo R. The modulo requirement of the computation is easily accomplished simply by returning only the rightmost k bits from the output of multiplier 80 to the input of y register 30.

As pointed out above, multiplication of numbers generally produces outputs having bit lengths greater than either of the two input number bit lengths. In particular, with respect to multiplier 70, the output is considered to be n+1+k bits in length. The low order (rightmost) k bit output is supplied from multiplier 70 to adder 65. However, each k bit block multiplication carried out in multiplier array 70 produces 2k bits formed as a k bit "result" and a k bit "carry" into the next position. The summation to produce the desired intermediate output $A_1$ is carried out in adder 75 which adds together two portions, the first portion which is n+1 bits long and the second portion which is only n+1–k bits long. The n+1–k bits represent the "carry" portion of the multiplication. Accordingly, the output of adder array 75 is the result of the high order n+1 bits of $A_1B$. This result is supplied directly to adder array 85 which adds to it a shifted value of $Z_1$ from Z register 50. And appropriately, these high order n+1 bits of $X_1=Z_1+A_1B$ is stored in Z register 50 in preparation for the Z-phase calculation. The low order k bits of $X_1$ are stored in register 55 as described above.

In the Z-phase of an operation cycle, multiplier array 70 and adders 75 and 85 are again employed except that now the inputs to multiplier array 70 are the contents of y register 30 as selected by multiplexor 31. The other factor supplied to multiplier array 70 is the contents of N register 40 which is selected during the Z-phase of an operation cycle by means of multiplexor 21. As before, multiplier array 70 computes the product of an n+1 bit number and a k bit number. Adder array 75 performs the natural addition operation associated with multiplication in which there is an effective carry-like operation from one k bit subfield to the next k bit subfield. Accordingly, the output of adder array 75 during the Z-phase of operation is the high order n+1 bits of the product $y_1N$. The addition of $y_1N$ and the value $X_1$ together with its division by R in the present method is accomplished by discarding the low order k bits from the output of adder 65 and storing only the high order n+1 bits from adder 85 to register 50.

Attention is now directed to a discussion of FIG. 5 which illustrates a typical processor element and, in particular, which illustrates the form of a processor element which may be repeated in a circuit/system chain which is as long as is required to process factors which are n bits wide. Such a chain is shown in block diagram form in FIG. 1.

With reference to FIG. 5, it is noted that it describes a Processing Element that is similar to the zeroeth Processing Element $P_0$, except that the part of the processing dealing with k bit wide operations involving s and $N_0$ need not be present in any processing elements except $PE_0$. In particular, FIG. 5 indicates that the generic form of a processing element $PE_p$ bearing reference numeral 200 specifically does include register BN (reference numeral 298) but does not include the registers associated with $P_0$. One of the significant differences between the zeroeth Processing Element $P_0$ and the generic Processing Element $P_p$ is that register 220 contains only a portion of the bits for the second factor B. In particular, register 220 contains 2k bit wide chunks designated as $B_{2p+2}$ and $B_{2p+1}$, where p ranges from 1 to d–1. Again, as above, multiplexer 221 selects either the 2k bits from register 220 or the 2k bits from register 240 which has corresponding portions (here 2k bits chunks) of the variable N. Accordingly, BN register 298 is 2k bits wide. In one exemplar embodiment of the present invention when n=512, register BN is 64 bits wide.

Figure 6:
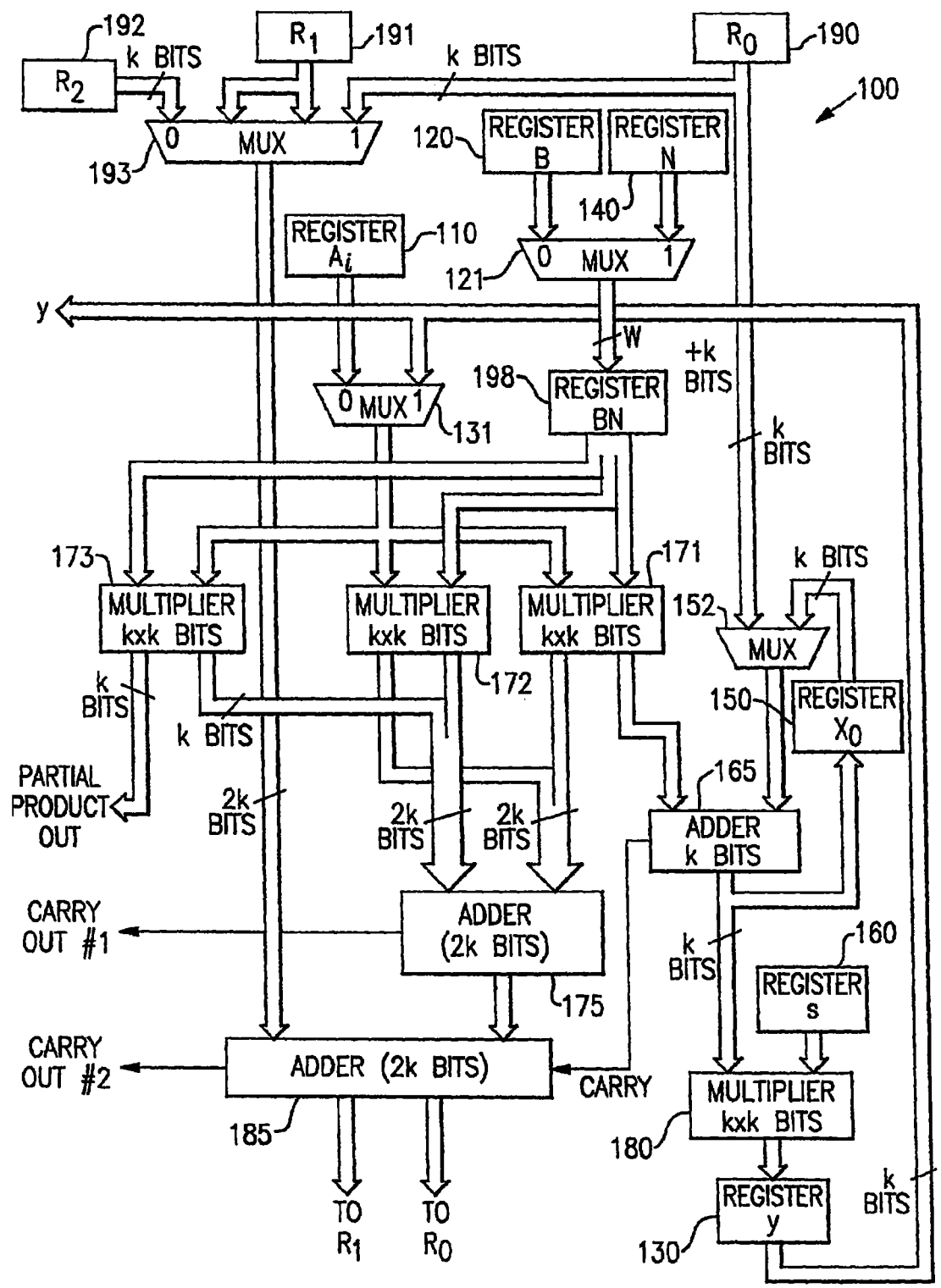
FIG. 6 is a block diagram providing a detailed view of the construction of the rightmost processing element, $P_0$.

With specific reference to FIG. 6, it is seen that multiplexor 193 operates during the X-phase to supply a 2k bit augend to adder 185. During the first or X-phase of operation, multiplexor 193 supplies a 2k bit number which has leftmost bits from register R2 (reference numeral 192) and rightmost bits from register $R_1$ (reference numeral 191). During the second or Z-phase of operation, multiplexor 193 supplies a different 2k bits of data to adder 185. In particular, during the Z-phase, multiplexor 193 supplies as its leftmost k bits the contents of register $R_1$, and as its rightmost k bits the contents of register $R_0$ (reference numeral 190).

In contrast to the full-width registers 10, 20, 40, and 50 in FIG. 4, the corresponding registers in a partitioned system have fewer bits. In particular, the corresponding B and N variable registers in a general processing element PE preferably employ a width equal to 2k bits. However, for the rightmost processing element, $P_0$, a larger number of bits is desired. In particular, in the case in which n equals 512, registers 120 and 140 in FIG. 4 preferably have a width of 96 bits. Multiplexor 121 selects the contents of register B (reference numeral 120) during the X-phase of computation and likewise selects the contents of register N (reference numeral 140) during the Z-phase of computation. In general, the overall n-bit wide series of computations is broken down into partitions of any convenient size. It is not even necessary that all of the processor elements are the same size or that they process data having the same width. However, for conveniences of circuit design and circuit layout, it is preferable that each of the individual processing elements (except for the rightmost element, $PE_0$) have the same data processing capability in terms of data width. Therefore, in general, for purposes of consideration and discussion herein, it is assumed that there are a total of d+1 processing elements labeled from $PE_0$ through $PE_d$. Processing element $PE_0$ preferably has a structure such as that shown in FIG. 6. $PE_d$ has the preferred structure illustrated in FIG. 6 of U.S. Pat. No. 6,978,016 referred to above. However, it is noted that a the more generic structure, such as that shown in FIG. 5, may also be employed for the leftmost processor element $PE_d$ though it is not necessary that this leftmost processing element be any more complicated than that shown in the aforementioned FIG. 6.

Also, for purposes of convenience of circuit design, layout, and packaging efficiency, it is generally desirable that the data width, W, of each processing element be an integer multiple of k. In the designs presented herein for a value of n=512, processor elements $PE_1$ through $PE_{d-1}$, each process data in 2k bit wide chunks. Thus, in this example, W=2k, where W is the width of the data in each of the typical or generic forms of processing element. It is noted that processor element $PE_0$ as shown in FIG. 6 possesses an extra k bit processing capability, as is more particularly described below. Thus, if each typical processing element $PE_1$ processes data in W bit wide chunks and if there are d+1 processing elements with the rightmost processing element processing an extra k bits, then it is the preferred case that n=Wd+k. Thus, in general, the output of multiplexor 121 preferably comprises W+k bits. The leftmost third of these bits are supplied to multiplier 173, the middle third of the bits in register BN (reference numeral 198) are supplied to multiplier 172, and the rightmost third bits are supplied to multiplier 171. Multipliers 171, 172, and 173 are thus each k bit by k bit multipliers. In this regard, it is noted that the original relatively large multiplier array 70 in FIG. 4 employs an n bit by k bit multiplier. However, it is noted that the partitioning of the computation into a system employing a plurality of nearly identical processing elements results in the construction of circuits which now utilize multipliers which operate much more quickly since each multiplier now is typically only k bits by k bits. And clearly, since k is typically much less than n, processing takes place significantly faster.

The leftmost of the 2k bits output from multiplier 173 are supplied as a partial product out (PPO) to the next unit in the chain, here $P_1$. In particular, it should be appreciated that in the discussions herein, that the natural order of processing is from the rightmost on through to the leftmost processing element in the chain. Thus, data is passed from one processing element to the processing element on its immediate left. However, it should be noted that left and right are relative terms useful essentially only for descriptive and understanding purposes. The rightmost k bits from multiplier 173 are supplied as the leftmost k bits of a 2k bit augend supplied to adder 175. The rightmost k bits of this 2k bit augend are supplied from the lower or rightmost k bits of multiplier 172. Thus, the rightmost k bits of multipliers 173 and 172, respectively, are combined, as shown in FIG. 6 to supply a 2k bit wide augend to adder 175. Adder 175 also has as its other input a 2k bit augend which is supplied from the leftmost k bits of multipliers 172 and 171, respectively, with multiplier 172 supplying the leftmost k bits of the 2k bit augend and with multiplier 171 supplying the rightmost k bits of the 2k bit augend supplied to adder 175. Thus, adder 175 is a 2k bit wide adder. An equivalent but alternate connection arrangement is shown in FIG. 4A of the cited patent to Chen et al.

Multiplexor 152 operates to select, during the X-phase of computation, k bits from register $R_0$ (reference numeral 190). During the Z-phase, multiplexor 152 selects as its input the contents of temporary register 150 containing the variable $x_0$. The output of multiplexor 152 is supplied to adder 165 which is k bits in width. Adder 165 receives two augends, namely, the rightmost k bits from multiplier 171 and the k bits supplied from multiplexor 152. The output of adder 165 is stored in temporary register 150 and is also supplied to multiplier 180 which is also a k bit by k bit multiplier. The other factor supplied to multiplier 180 is the contents of register 160 which contains the variable s. (The calculation of s as $-1/N_0$ mod R is efficiently carried out in the circuit shown in the patent to Chen et al. for which the present invention is an improvement.) The output of multiplier 180 is supplied to register 130 which thus contains the value y as defined by the algorithm set out in the cited patent.

The output of register 130 is supplied to multiplexor 131 and is also supplied to the next processing element $PE_1$ (see FIG. 4). Multiplexor 131 operates to select a portion of the variable A which is one of the factors in the multiplication operation. (Other k bit wide portions of variable A are selected from registers associated with their respective processing elements.) In particular, in $PE_0$ register 110 contains the rightmost k bits of the variable A. Thus, during the X-phase of operation, multiplexor 131 operates to select the contents of register 110 to be supplied to multipliers 173, 172, and 171, as shown. Likewise, during the Z-phase of computation, multiplexor 131 operates to select the variable y from register 130 to be supplied to this same set of multipliers as the other factor.

A carry-out signal line from adder 165 is also supplied as a carry input to the lowest order position in adder 185, as shown. Additionally, adder 175 supplies a first carry-out signal line to the next processing element in the chain; similarly, adder 185 also supplies a second carry-out signal line to the next processing element in the chain. In particular, since FIG. 6 illustrates processing element $PE_0$, carry-out signal line 1 and carry-out signal line 2 are both provided to the specific processing element $PE_1$. The connections between $PE_0$ and $PE_1$ are readily apparent simply by placing FIG. 6 to the right of FIG. 5. In particular, processing element $PE_0$ supplies the variable y, the partial product out, and the two carry-out signal lines to the inputs shown in $PE_1$ of FIG. 5. In particular, it is also noted that the variable y (that is, the contents of register 130) is also supplied to each one of the individual processing elements, $PE_2$ through $PE_d$. And lastly, with respect to FIG. 6, it is noted that the output of adder 185 is supplied to registers $R_0$ and $R_1$ shown at the top of FIG. 6. As indicated above, it is the register set (containing $R_1$ and $R_0$ on the right) which ultimately contains the desired calculation result. Accordingly, reference numeral 400 in FIG. 2 does not include this register set. This register set is discussed separately above in terms of some of the other variations and structures that are employed in the present invention.

From an overall perspective, generic processing element $PE_p$ (reference numeral 200 as shown in FIG. 1) accepts, as input from the right, the value of y (but only from $P_0$), the partial product in (PPI), carry-in 1 ($C_1$) and carry-in 2 ($C_2$). Processor element $PE_p$ also has as an input the corresponding portion of the k bits of the multiplier factor A from register 210 (See FIG. 5). The register involvement for registers, 292, 291, and 290 is as shown in FIG. 5. It is these registers that store intermediate values between phases and ultimately store the completed product, AB mod N. Also, from an overall perspective, processor element 200 produces, as an output, a k bit partial product out which is supplied to the processor element on its left together with carryout signals 1 and 2 ($C_1$ and $C_2$) which are supplied to the corresponding adders 275 and 285 in the processor element on the left. The output of adder 285 is supplied back to registers $R_{2p+1}$ and $R_{2p}$. Accordingly, other than the connections to the register sets for R, B, N, and A, the processing elements are connected simply by matching partial products in and out and carries in and out ($C_1$ and $C_2$). Accordingly, in systems constructed in accordance with those aspects of the present invention which employ a plurality of similar processing units, the overall system is constructed by starting with the circuit shown in FIG. 4 or 4A of the cited patent as a rightmost position and placing, in adjacent positions, processing elements similar to those shown in FIG. 5 herein. The overall configuration, therefore, is seen in FIG. 1.

In particular, it is noted that cryptographic engine(s) 195 exhibit a pipelined architecture such as those disclosed in U.S. Pat. No. 7,080,110. The partitioning of large arrays in the hardware structures of modulo N arithmetic circuits in cryptographic engine(s) 195, for multiplication and addition, into smaller structures results in a multiplier design comprising a series of nearly identical processing elements linked together in a chained fashion. As a result of a two-phase operation, as described in the aforementioned patent, and the chaining together of the partitioned processing elements, the overall cryptographic engine structure is operable in a pipelined fashion to provide improved throughput and speed.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of cryptographic processing, said method comprising
    providing a cryptographic engine comprising a plurality of processor elements, the plurality of processor elements being serially connected;
    providing an input data bank controlled by a control circuit, the input data bank providing blocks of data to be simultaneously processed by different subsets processor elements of the plurality of processor elements, in which a plurality of multiplications are simultaneously performed on the blocks of data by the different subsets of processor elements;
    dynamically partitioning the plurality of processor elements of the cryptographic engine to facilitate processing a first cryptographic key and a second cryptographic key, the first cryptographic key and the second cryptographic key being of different key size, the dynamically partitioning comprising:
        isolating, via the control circuit, the plurality of processor elements into a first plurality of subsets of processor elements based on the first cryptographic key to be processed by the cryptographic engine, wherein a number of subsets of processor elements in the first plurality of subsets of processor elements is dependent on a number of blocks of data in a first plurality of blocks of data to be processed by the plurality of processor elements, and a number of processor elements in a particular subset of processor elements of the first plurality of subsets of processor elements is dependent on the particular block of data to be processed by the particular subset of processor elements and on a variable number of bits to be processed by the processor elements of the particular subset of processor elements, the variable number of bits being dependent on a computational operation to be performed on the particular block of data, and wherein the first plurality of blocks of data are processed independently and simultaneously;
        isolating, via the control circuit, the plurality of processor elements into a second plurality of subsets of processor elements based on the second cryptographic key to be processed by the cryptographic engine, wherein a number of subsets of processor elements in the second plurality of subsets of processor elements is dependent on a number of blocks of data in a second plurality of blocks of data to be processed by the plurality of processor elements, wherein the second plurality of subsets of processor elements differs from the first plurality of subsets of processor elements, and wherein one processor element and an adjacent processor element, an input of which is directly connected to the output of the one processor element, are in a same subset of the first plurality of subsets of the processor elements as a result of the isolating the plurality of processor elements into the first plurality of subsets of processor elements, and the one processor element and the adjacent processor element are in different subsets of the second plurality of subsets of the processor elements as a result of the isolating the plurality of processor elements into the second plurality of subsets of processor elements; and
    wherein the dynamically partitioning is to facilitate maintaining the plurality of processor elements of the cryptographic engine in active processing state notwithstanding the different key size of the first cryptographic key and the second cryptographic key.

2. The method of claim 1, wherein the number of subsets of processor elements in the second plurality of subsets of processor elements is different from the number of subsets of processor elements in the first plurality of subsets of processor elements.

3. The method of claim 1, wherein the number of processor elements in a subset of processor elements of the second plurality of subsets of processor elements differs from the number of processor elements in a subset of processor elements of the first plurality of subsets of processor elements.

4. The method of claim 1, wherein said plurality of processor elements implement multiplication modulo N.

5. The method of claim 4, wherein said plurality of processor elements carry out said multiplication modulo N in two phases.

6. The method of claim 1, wherein blocks of said first plurality of blocks of data are not all of the same size.

7. A cryptographic system comprising:
    a cryptographic engine, the cryptographic engine comprising:
        a plurality of processor elements, the plurality of processor elements being serially connected;
        a control circuit to facilitate dynamic partitioning of the plurality of processor elements of the cryptographic engine to facilitate processing a first cryptographic key and a second cryptographic key, the first cryptographic key and the second cryptographic key being of different key size;
        an input data bank controlled by the control circuit, the input data bank providing blocks of data to be simultaneously processed by different subsets of processor elements of plurality of processor elements, in which a plurality of multiplications are simultaneously performed on the blocks of data by the different subsets of processor elements, and wherein:
            the control circuit isolates the plurality of processor elements into a first plurality of subsets of processor elements based on the first cryptographic key to be processed by the cryptographic engine, wherein a number of subsets of processor elements in the first plurality of subsets of processor elements is dependent on a number of blocks of data in a first plurality of blocks of data to be processed by the plurality of processor elements, and a number of processor elements in a particular subset of processor elements of the first plurality of subsets of processor elements is dependent on the particular block of data to be processed by the particular subset of processor elements and on a variable number of bits to be processed by the processor elements of the particular subset of processor elements, the variable number of bits being dependent on a computational operation to be performed on the particular block of data, and wherein the first plurality of blocks of data are processed independently and simultaneously; and the control circuit isolates the plurality of processor elements into a second plurality of subsets of processor elements based on the second cryptographic key to be processed by the cryptographic engine, wherein a number of subsets of processor elements in the second plurality of subsets of processor elements is dependent on a number of blocks of data in a second plurality of blocks of data to be processed by the plurality of processor elements, wherein the second plurality of subsets of processor elements differs from the first plurality of subsets of processor elements, and wherein one processor element and an adjacent processor element, an input of which is directly connected to the output of the one processor element, are in a same subset of the first plurality of subsets of the processor elements as a result of the isolating the plurality of processor elements into the first plurality of subsets of processor elements, and the one processor element and the adjacent processor element are in different subsets of the second plurality of subsets of the processor elements as a result of the isolating the plurality of processor elements into the second plurality of subsets of processor elements; and wherein the dynamically partitioning is to facilitate maintaining the plurality of processor elements of the cryptographic engine in active processing state notwithstanding the different key size of the first cryptographic key and the second cryptographic key.

8. The system of claim 7, wherein the number of subsets of processor elements in the second plurality of subsets of processor elements is different from the number of subsets of processor elements in the first plurality of subsets of processor elements.

9. The system of claim 7, wherein the number of processor elements in a subset of processor elements of the second plurality of subsets of processor elements differs from the number of processor elements in a subset of processor elements of the first plurality of subsets of processor elements.

10. The system of claim 7, wherein said plurality of processor elements implement multiplication modulo N.

11. The system of claim 10, wherein said plurality of processor elements carry out said multiplication modulo N in two phases.

12. The system of claim 7, wherein blocks of said first plurality of blocks of data are not all of the same size.

13. The method of claim 1, wherein a number of bits a processor element is to process varies according to an arrangement of the processor element in the subset.

14. The system of claim 7, wherein a number of bits a processor element is to process varies according to an arrangement of the processor element in the subset.

15. The method of claim 1, wherein:
the number of subsets of processor elements in the second plurality of subsets of processor elements is different from the number of subsets of processor elements in the first plurality of subsets of processor elements;
the number of processor elements in a subset of processor elements of the second plurality of subsets of processor elements differs from the number of processor elements in a subset of processor elements of the first plurality of subsets of processor elements;
the computational operation comprises a multiplication operation; and
a number of bits a processor element is to process varies according to an arrangement of the processor element in the subset.

16. The method of claim 15, wherein blocks of the first plurality of blocks of data are not all of the same size.

17. The system of claim 7, wherein:
the number of subsets of processor elements in the second plurality of subsets of processor elements is different from the number of subsets of processor elements in the first plurality of subsets of processor elements;
the number of processor elements in a subset of processor elements of the second plurality of subsets of processor elements differs from the number of processor elements in a subset of processor elements of the first plurality of subsets of processor elements;
the computational operation comprises a multiplication operation; and
a number of bits a processor element is to process varies according to an arrangement of the processor element in the subset.

18. The system of claim 17, wherein blocks of the first plurality of blocks of data are not all of the same size.

19. The method of claim 1, wherein the number of processor elements in the particular subset of processor elements of the first plurality of subsets of processor elements is dependent on a divisor based on a factor of a multiplication operation to be performed on the particular block of data.

20. The method of claim 19, wherein the divisor, k, is a divisor of, n, based on factor n−1 of the multiplication operation, wherein one processor element of the particular subset of processor elements has a data width 2k+k and the other processor elements of the particular subset of processor elements each have a data width, W, of 2k, and wherein the number of processor elements, d+1, satisfies the equation: $n = Wd + k$.

* * * * *